United States Patent [19]

Lang et al.

[11] 3,895,683

[45] July 22, 1975

[54] LATERAL ACCELERATION SENSING SYSTEM

[75] Inventors: Thomas J. Lang, Torrance, Calif.; Kenneth G. Lang, East Northport; Joseph A. Lang, Huntington Station; Robert L. Davis, Lloyd Harbor, all of N.Y.

[73] Assignee: Lang Davis Industries, Inc., Huntington, N.Y.

[22] Filed: July 5, 1972

[21] Appl. No.: 269,035

[52] U.S. Cl. .................... 180/103; 188/3 R; 303/7; 303/20
[51] Int. Cl. ............................................. B60t 7/20
[58] Field of Search .......................... 180/103–104; 188/3 R, 112, 181 A; 303/7, 20, 21 CG, 24; 280/446 B

[56] References Cited
UNITED STATES PATENTS

| | | | |
|---|---|---|---|
| 3,053,348 | 9/1962 | Stair | 188/112 |
| 3,288,240 | 11/1966 | Franzel | 180/103 UX |
| 3,398,991 | 8/1968 | Compton | 303/7 |
| 3,486,799 | 12/1969 | Greentree | 303/24 C X |
| 3,566,987 | 3/1971 | Franzel | 180/103 |
| 3,715,003 | 2/1973 | Jubenville | 303/20 X |

FOREIGN PATENTS OR APPLICATIONS 2,024,406  12/1970  Germany .......................... 188/112

Primary Examiner—Trygve M. Blix
Assistant Examiner—Stephen G. Kunin
Attorney, Agent, or Firm—Clarence A. O'Brien; Harvey B. Jacobson

[57] ABSTRACT

A system is disclosed which senses the lateral acceleration of a vehicle to actuate an apparatus related thereto. The sensing system comprises two pendulums, one sensing lateral forces in one direction, the other sensing these forces in another direction and interconnect through associated circuitry to the braking or other system of that vehicle or an associated vehicle. Movement of either pendulum beyond a predetermined angular position as sensed by a potentiometer causes actuation of the brakes or other system of the vehicle or vehicles whose lateral acceleration is being sensed. The further the pendulum swings from its home position, the greater the amount of braking is applied. The swinging of the pendulum can also actuate a series of indicator lights on the dashboard of the vehicle. These lights will indicate the functioning of the sensing system by the actuation of green, yellow, or red lights.

5 Claims, 20 Drawing Figures

PATENTED JUL 22 1975　　3,895,683

SHEET 1

FIG.10  FIG.11  FIG.12
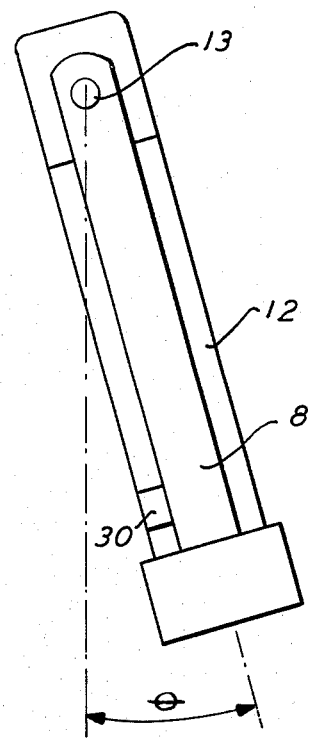
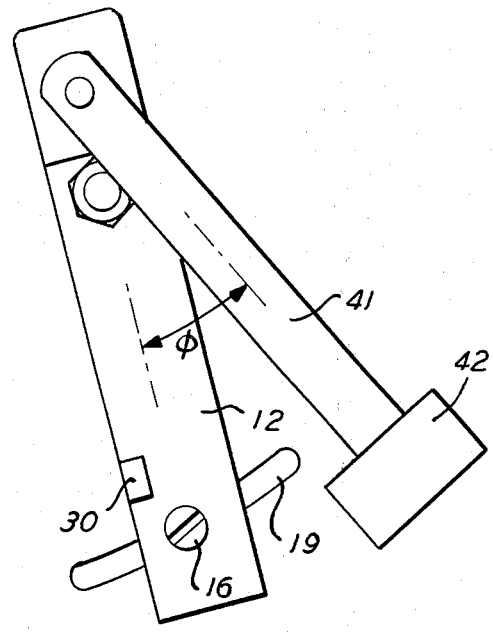
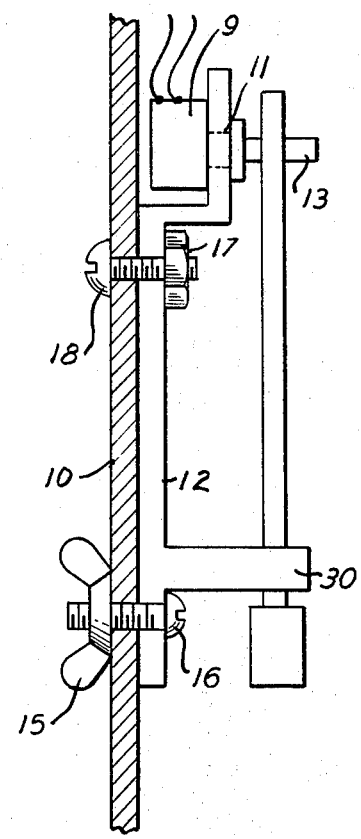
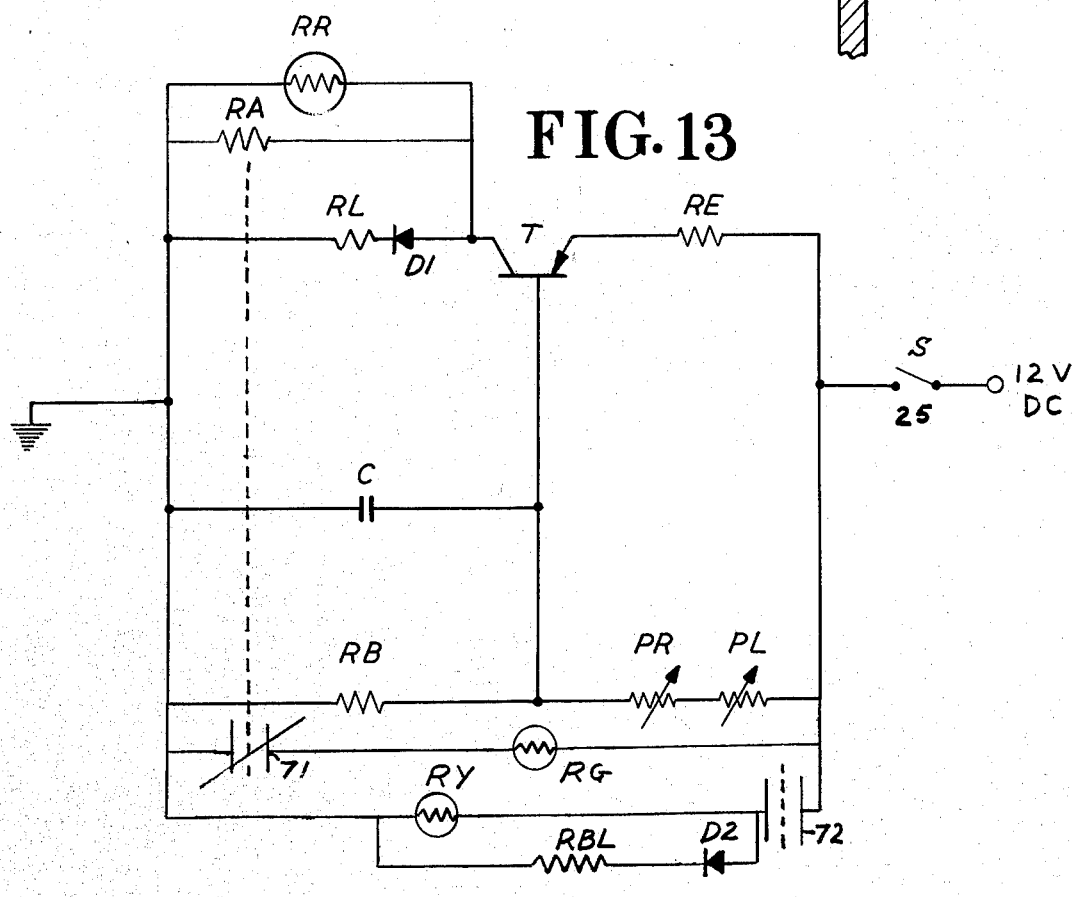
FIG.13

EXISTING HYDRAULIC RESERVOIR AND BRAKING SENSOR

ADDED SOLENOID VALVE OR ELECTRICALLY ACTIVATED PISTON

HYDRAULIC FEED LINES 52

LATERAL ACCELERATION SENSING SYSTEM

BACKGROUND OF THE INVENTION

This invention relates to systems that sense the lateral acceleration of a vehicle and especially sense this force while the vehicle is in motion. More particularly, the invention is related to sensors which determine the lateral force on a trailer which is being towed by an automobile. This lateral force, which is often known as centrifugal force, is the outward force exerted on the vehicle and trailer moving in a curved path and can cause the trailer to go out of control with respect to the automobile that is towing it and either damage itself or both itself and the automobile. What tends to happen is that the operator of the vehicle is relatively inexperienced at towing a trailer. The operator then proceeds to operate the vehicle at a normal rate of speed forgetting that he is towing a trailer. He will then attempt to negotiate curves and corners with the trailer at the same rate of speed that he is used to doing with the vehicle alone. This will cause the towed vehicle to skid or tip due to the aforementioned lateral force and go out of control. The problem is that the vehicle operator is proceeding at too fast a rate of speed for the trailer to negotiate the particular curve. What is needed is a braking system that will automatically actuate the brakes on the trailer when this lateral acceleration or force on the trailer exceeds a predetermined amount. When the speed of the automobile around the curve exceeds this preset amount the system should automatically begin to actuate some braking force on the trailer to slow the trailer down and thereby cause the driver of the automobile to realize he is proceeding too fast and to also slow down the automobile because of the drag caused by the braking trailer. The present systems now in operation require the operator of the automobile to manually apply the brakes on the trailer. There is no effective system that will automatically apply the trailer brakes itself without relying on the operator. It would also be extremely useful if the system could independently determine acceleration in either lateral direction so that if there was lateral acceleration as is the usual case in negotiating a turn, the system would respond properly to actuate the brakes of the trailer. The system should also be one that would respond to any lateral acceleration, not only that produced by movement around a curve it should also react to the force of wind and other similar forces. It would also be quite useful if the system was such that it could be interconnected into the normal electrical or hydraulic braking system of the trailer without having to reconstruct the entire system. This invention then envisions a simply constructed lateral acceleration sensing system which integrates into the present circuitry of the braking system of a trailer to quickly and automatically brake the trailer when the lateral force exceeds a predetermined limit.

SUMMARY OF THE INVENTION

A system for indicating the lateral acceleration of a vehicle and especially the lateral acceleration when the vehicle is towing another vehicle. The indicating system comprises two pendulums, each one of which senses lateral acceleration in a particular direction. The pendulums are interconnected by means of potentiometers to the braking system or other system of the automobile, or the towed vehicle so that as the lateral force increases, the displacement of the pendulums' arms increase to cause the resistance of the potentiometers to change. This change in resistance actuates the braking system on the trailer to slow down its speed or actuates another system on the vehicle such as a sound alarm. A signal-indicating means can also be provided which acts in conjunction with these systems to indicate the functioning of the sensor.

BRIEF DESCRIPTION OF THE DRAWINGS

FIG. 10 is a view in more detail of the pendulum sensing device shown in FIG. 9;

FIG. 11 is a device of FIG. 10 in the activated position;

FIG. 12 is a side view of the device of FIG. 11;

FIG. 13 is an example of an electrical schematic for the amplifier of FIG. 8;

PREFERRED EMBODIMENT OF THE INVENTION

Figure 1:
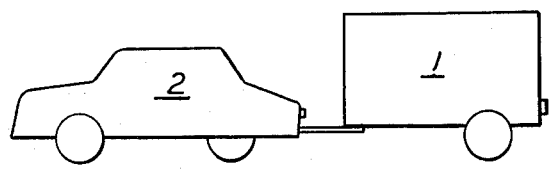
FIG. 1 shows an overall view of an automobile equipped with the system of this invention pulling a trailer.
Figure 2:
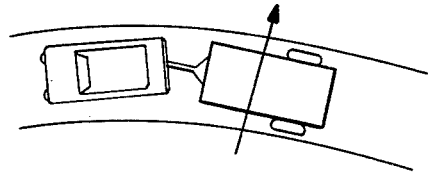
FIG. 2 is a top view showing an automobile equipped with this invention pulling a trailer around a curve.
Figure 3:
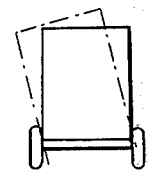
FIG. 3 shows a front view of the trailer of FIG. 2 indicating in dotted lines the angle of tilt.

As shown in FIG. 1, this invention relates to a device which automatically senses the lateral acceleration of a vehicle and especially the lateral acceleration of a vehicle being towed. FIG. 1 shows a use where a trailer 1 is being towed by an automobile 2. As shown in FIG. 2 and as will be described in more detail, when the automobile proceeds around a curve with the trailer, if the velocity of the automobile and trailer exceeds a predetermined amount, the automobile and trailer will tend to have a certain lateral acceleration applied to them which will (as shown by the dotted lines in FIG. 3) cause an imbalance movement or skidding of the trailer. This movement can cause the trailer to jackknife, that is, swing out of control and towards the automobile or to topple over or to otherwise cause the automobile to lose control of the trailer.

The sensor which will be described in more detail hereinafter consists of two pendulums, one of which is shown schematically in FIGS. 10, 11 and 12. Basically, as either pendulum 8 rotates through an angular position (see difference between FIGS. 10, and 11) from its normal position (FIG. 10) it increases the resistance of a variable potentiometer 9 in the circuit that actuates the brakes on the trailer. As this resistance is increased the brakes on the trailer are first actuated and then continue to be actuated to a greater degree until, if necessary, they reduce the lateral acceleration below the predesignated amount.

Figure 6:
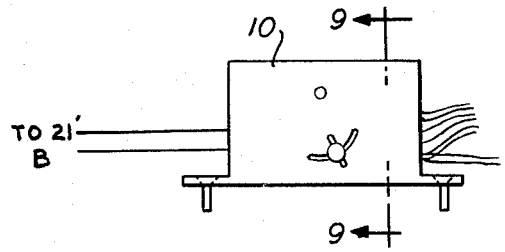
FIG. 6 shows an overall view of the sensor unit of this invention.
Figure 7:
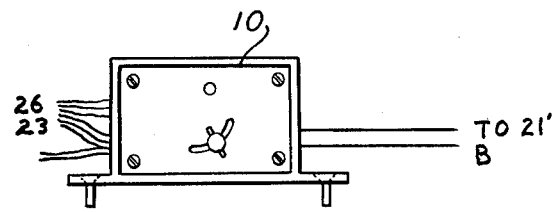
FIG. 7 is another view of the device of FIG. 6.
Figure 8:
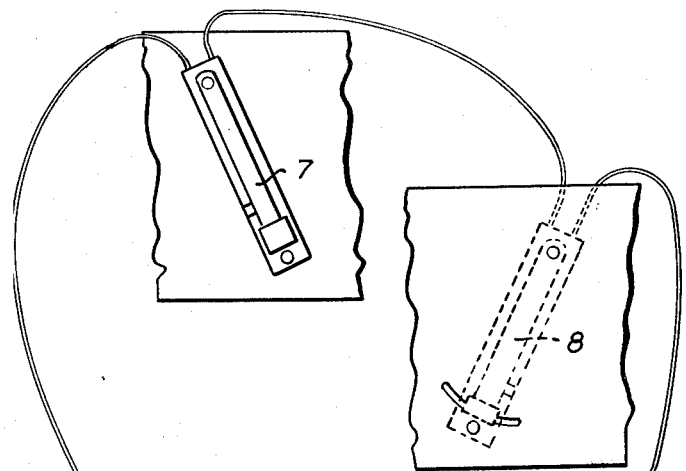
FIG. 8 is a block diagram of the device of FIG. 6.
Figure 8:
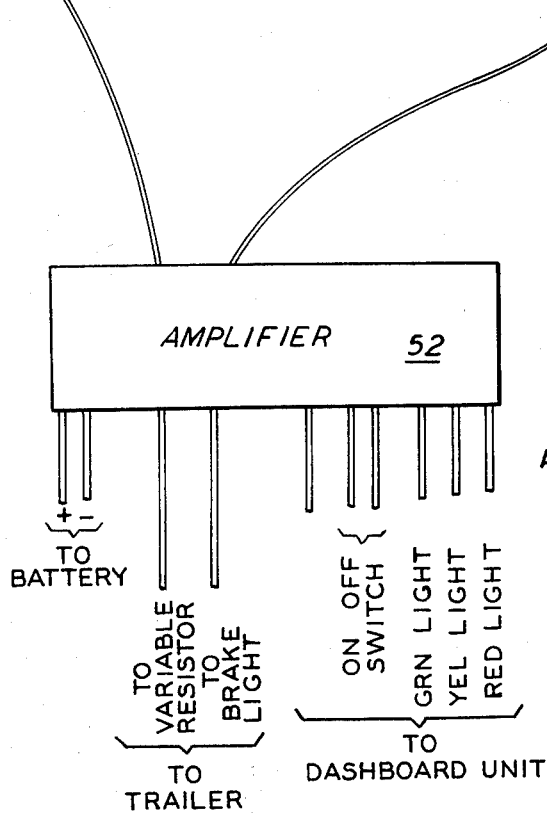
Figure 9:
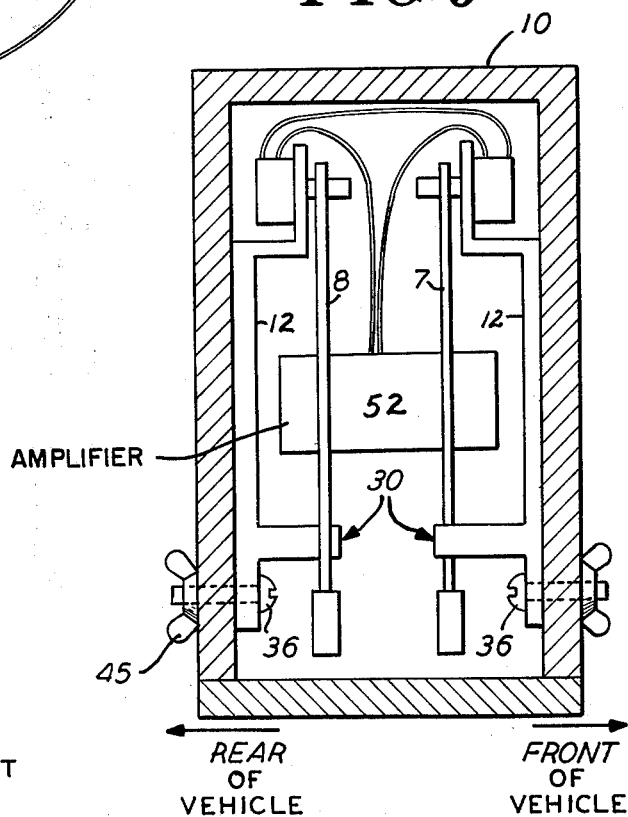
FIG. 9 is a view along line 9—9 of FIG. 6.

In more detail, the sensing device consists of two pendulums 8 and 7 which are positioned in an enclosed container 10 as shown in FIGS. 6, 7, and 9, the latter being a cross section of FIG. 6. This unit is placed in the trunk (FIGS. 19 & 4) or other convenient location of the automobile and positioned so that the direction of swing of the pendulums is parallel to each other and perpendicular to the direction of movement of the automobile. The pendulums will also each swing in only one direction each pendulum being limited in its swing by stop 30. It will be seen from FIG. 8 which is a view of FIG. 6 with most of the container removed for clarity. The pendulum 7 will swing towards the right to sense acceleration in one direction and pendulum 8 will swing towards the left to sense acceleration in the other direction or as shown in FIG. 9 pendulum 8 will swing out of the plane of the drawing (away from stop 30) and pendulum 7 will swing into the plane of the paper from stop 30. In this manner each of the pendulums will sense lateral movement in either the right or left direction. It is also noted that in a usual case only one of the pendulums will swing since the lateral acceleration will only be in one direction. These pendulums are connected to the electrical or hydraulic system that actuates the brakes on the trailer. There is also a light indicating system to indicate whether firstly, the sensors are reacting to lateral acceleration and secondly, whether they have reacted to the point where they have begun to apply the brakes on the trailer. Basically, this consists of a unit which mounts on the dashboard of a vehicle and has a green light which indicates that no actuation is taking place, a yellow warning light which indicates that the sensors have been actuated and a red light indicating that they have begun to apply the brakes on the trailer. This will be described in more detail hereinafter.

Referring now in detail to FIGS. 10, 11 and 12 these figures show one of the pendulums, pendulum 8, however pendulum 7 is exactly the same — except it is mounted so that it will swing in the opposite direction, as shown in FIG. 8. Each pendulum 7 and 8 is initially set to a predetermined angular position, as shown in FIG. 10, this position would be at an angle $\theta$ from the vertical. Each pendulum is connected to the support 12 and to the potentiometer by means of pivot pin 13 which is the shaft of the potentiometer. The pin also passes through aperture 11 in support 12. This support is connected by means of wingnut and screw 15 and 16 and bolt and nut 17 and 18 to fixed support 10 the container. When it is desired to change the angle of the support 12 the wingnut 15 in FIG. 12 is loosened and bolt 16 is moved in channel 19 (FIG. 11) in the fixed support to move support 12 to a new angular position. This sets the new home position of the pendulum. The home position of the pendulum is where it is unaffected by lateral acceleration. It will be appreciated that as the pendulum is moved to increased angular (angle $\theta$) home positions, the more lateral acceleration the system can withstand without the brakes being actuated. In other words, as angle $\theta$ is increased from the vertical, the lateral acceleration that would have driven it to the angle $\theta$ position will not cause the pendulum to swing. The lateral acceleration has to always be greater than angle $\theta$ to cause the pendulum to react. This angle is adjustable by simply loosening wingnut 15, as shown in FIG. 12 or other suitable adjusting means, to change this preset angular position. The home position will be determined by the particular automobile and trailer combination, that is, what curves and speeds can be negotiated by this particular automobile and trailer without incurring excessive lateral acceleration. This predetermined angle $\theta$ anticipates how much lateral acceleration can be withstood before difficulties ensue. In other words, the angle $\theta$ indicates that the pendulum could swing through that angle by the forces of lateral acceleration on the vehicle without the trailer tilting or swinging to a point where it would be dangerously out of control or skidding. Any movement beyond the angle $\theta$ such as that shown by angle $\phi$ in FIG. 11 indicates that the lateral acceleration has gotten to the point where the vehicle may begin to lose control of the trailer either due to excessive tilting or loss of sufficient lateral traction to prevent skidding. Basically the pendulum consists of a weighted lower part 42, a long cantilever arm 41, which arm is connected by a pin 13 to the potentiometer. The pivot pin about which each pendulum swings is rotatable part of potentiometer 9, the movement of this member changes the resistance of the potentiometer as usual with circular potentiometers. Thus, as each pendulum rotates, it rotates the potentiometer and thereby changes the resistance in the circuit to which the potentiometer is connected. From FIG. 9 it will be seen that the pendulum toward the front of the vehicle is positioned to rotate in one direction, that is, to sense righthand turns and the potentiometer toward the rear of the vehicle is positioned in the opposite direction so it will sense left hand turns.

Figure 4:
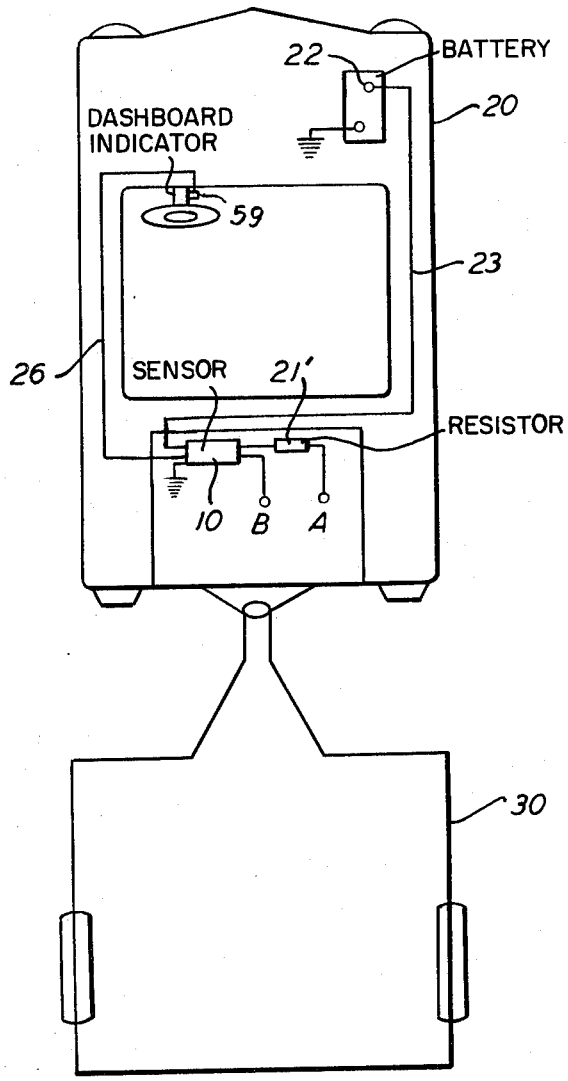
FIG. 4 shows a top view of the system of this invention as installed in a vehicle towing a trailer.
Figure 5:
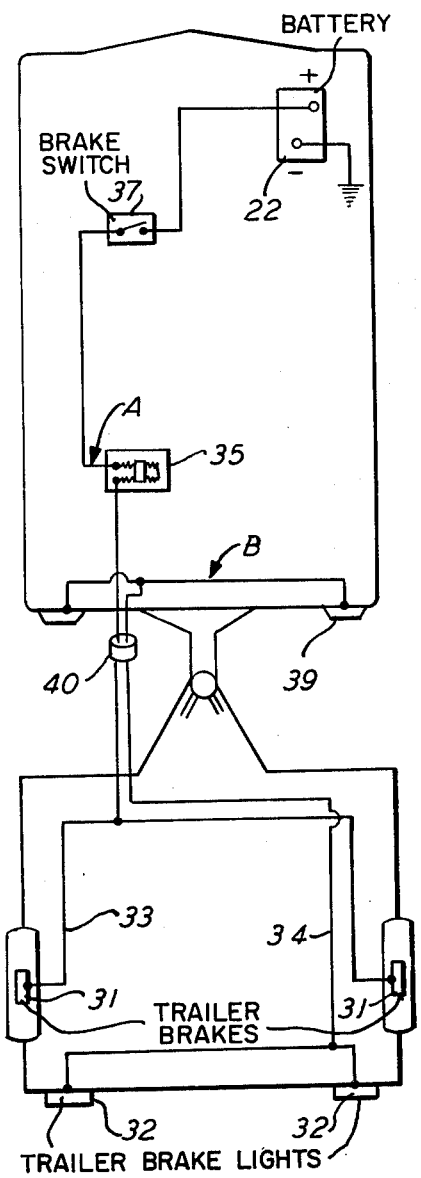
FIG. 5 shows the general manually applied electric braking circuitry of an automobile with a trailer.
Figure 19:
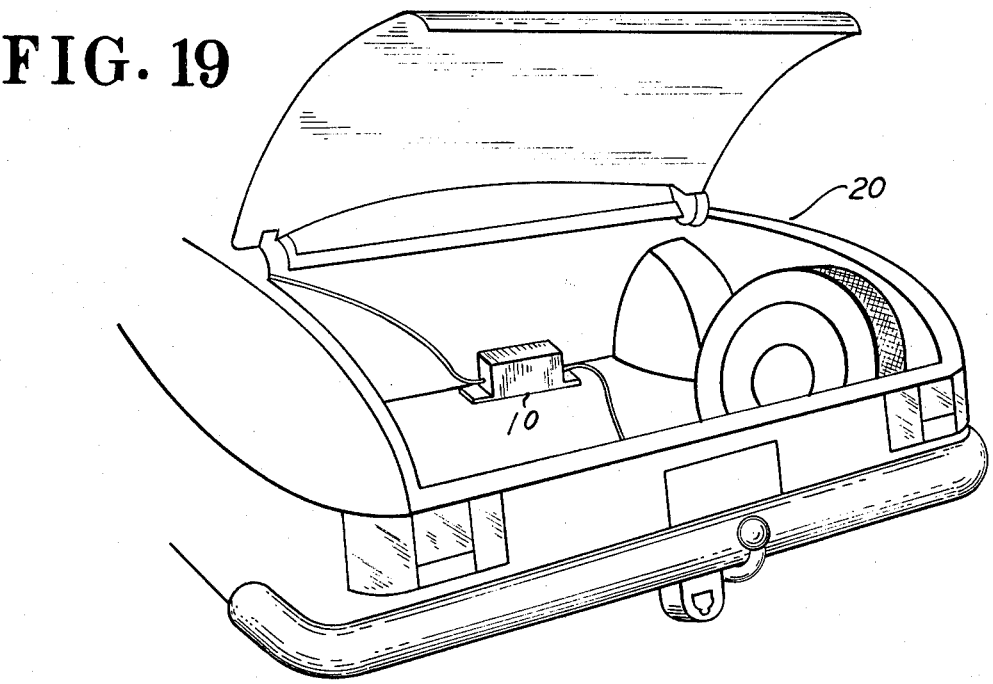
FIG. 19 is a view of the sensing unit installed in the trunk of an automobile.
Figure 18:
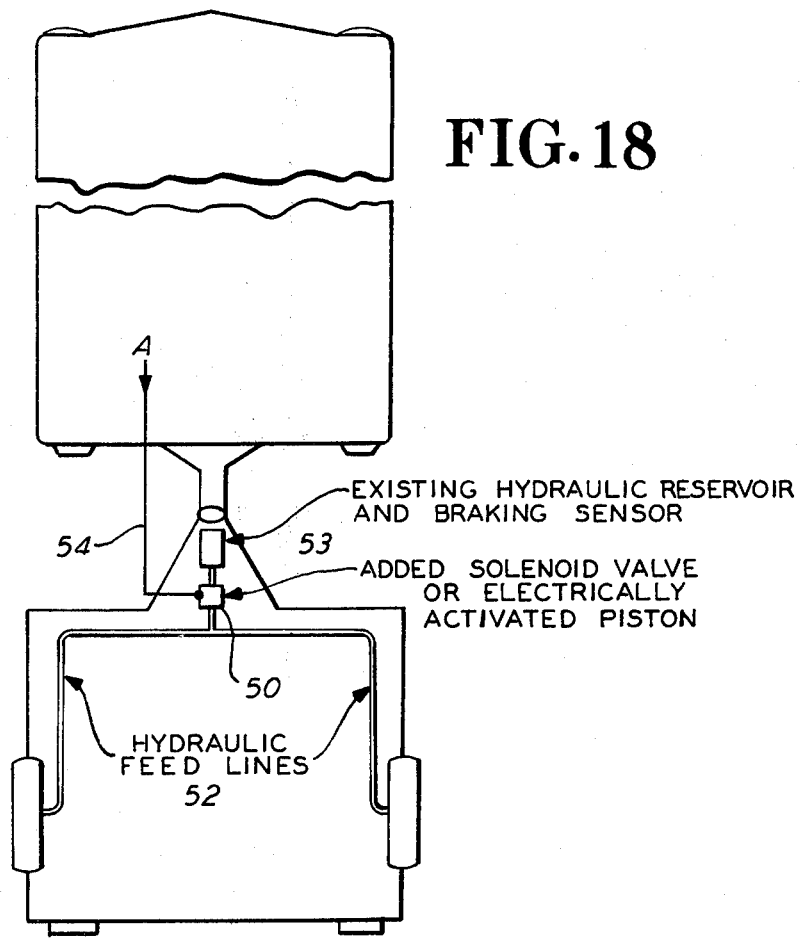
FIG. 18 is a view of the solenoid system for connecting this invention to hydraulic brakes.

An amplifier 52, as shown in FIG. 8, is preferably connected into the circuit between the potentiometers and the rest of the circuit to greatly amplify the small actual movement of the pendulums. The amplifier 52 is positioned between the pendulums and the rest of the circuit. This is illustrated clearly in FIG. 8 where the wires to the battery, to the trailer (to its brake lights and brakes), and to the dashboard indicator (the red, yellow and green lights and the off/on switch) are shown. If the amplifier were not positioned in the circuit the movement of the pendulums which is so slight might not properly actuate the mechanism. By including an amplifier in the circuit, slight changes in the position of the pendulum are magnified so that the system will be more sensitive and will more accurately control the mechanism. Slight changes in lateral acceleration can be more accurately measured. The container 10 in which the pendulums are positioned is preferably encased in a durable material such as steel, plastic or aluminum and may consist of a removable black plate which is fastened by screws and which may be removed to service the pendulums. This unit 10, as aforementioned, is placed in the trunk of an automobile 20 as shown in FIG. 19. The unit is electrically connected to the battery 22 of the automobile (wire 23) FIG. 4 and also connected to the dashboard indicator unit 59 by wire 26. There is an off/on switch 25 located on the indicator unit (FIG. 15) to turn the entire sensing system off and on. The sensing unit is also interconnected to the normal electric braking circuitry by connecting point A of FIG. 4 to point A of FIG. 5 (the normal manual electric brake circuit). Briefly, FIG. 5 illustrates the normal manual braking circuit of an automobile trailer combination. The trailer brakes 31 and stop lights 32 are connected by means of wires 33 and 34 to the stop lights 39 and brake switch 37 of the automobile. The latter which receives its power from battery 22 is the normal manual brake switch (either a hand operated device positioned on the steering wheel or a foot pedal positioned alongside the normal acceleration pedal of the automobile) FIG. 5 then shows the normal braking system — closing switch 37 will actuate the trailer brakes. The trailers brake lights are connected to the brake lights of the automobile so that when the automobile lights go on in the normal manner the trailer brake lights will go on. This is described in more detail hereinafter. To connect the system of this invention to the system of FIG. 5 point A of FIG. 4 is joined to point A of FIG. 5; the automatic brake system of this invention will then be connected so that it automatically operates the trailer brakes. The system of this invention will then be connected through potentiometer 35 directly to the brake lines 33 and the brakes of the trailer. The present system also is connected to the brake lights of the trailer so that when the brakes are applied on the trailer, the brake lights are also actuated. To accomplish this, the points B of FIG. 4 and FIG. 5 are connected. This will connect the sensor 10 of this invention to the brake lights 39 of the car. The brake lights of the car are connected through wire 34 to the brake lights of the trailer as aforementioned so that now when the sensor 10 is activated both the brake lights of the car and those of the trailer will go on. The variable resistor 21 prime may be placed in the circuit between the pendulums and the brakes of the trailer to control the current to the braking system. This is done so that the power applied by the automatic system of this invention will be less than that applied by brake switch 37. This is to provide for more gradual braking by the system of this invention then is normally done by actuating switch 37. To connect the wires of the trailer to those of the automobile an electrical connecter 40 is provided between the two. Basically, the brakes may be electrical brakes where the brake shoes expand under the actuation of solenoids when the brake pedal is applied or alternately they can be hydraulic brakes which are actuated by hydraulic pressure. If electric brakes are used on the trailer the output wires of the system of this invention are correctly connected into the electrical circuit of the brakes. as described above. However, if hydraulic brakes are used, then a solenoid valve or electrically activated piston 50 is placed in the brake lines to the trailer brakes (as shown in FIG. 18). The brake lines 52 are connected to reservoir 53 in the conventional manner with piston 50 therebetween, the piston being so arranged that it will be actuated electrically by the output wires of the invention. (Wire 54 which is connected to point A in the same manner as with the previous example will connect the solenoid to the system of this invention). The system will now apply a graduated braking force to the brakes in the same manner as with the electrical system.

It should be noted that while one pendulum acts for right turns and one acts for left turns either one of them applies both of the brakes on the trailer since if the trailer is tilting in either direction the desire is to brake the trailer completely, and not only one side of it. However, it will be appreciated that if it was desired to only brake one side or the other the pendulums could be so arranged so that each one only actuates the brakes on one side of the trailer. Alternatively the pendulums could be so arranged that below a certain speed each pendulum would only actuate its particular brake and above a certain speed either one would actuate both brakes. This might be done so that if the speed did exceed a certain amount but was not above another amount the situation could be rectified by simply actuating one brake or the other but if the speed did exceed a predetermined amount then both would have to be actuated.

The amplifier circuit is shown in somewhat idealized configuration in FIG. 13. It will be appreciated, however, that there are many amplifier circuits that would be useful with this invention and this is just one particular example. The two potentiometers are indicated by PR and PL, PR being the potentiometer for right turn sensing and PL being the potentiometer for left turn sensing. These potentiometers are connected between the base and emitter of Transistor T. As either of these potentiometers is increased from zero by its pendulum swinging away from its home position as shown in FIG. 11 Transistor T is biased into the operating range. The collector of the transistor is connected to the trailer brakes 31 so that as either potentiometer is increased from zero current will flow to the electrical braking system of the trailer RL to actuate its brakes. As the voltage increases across the braking system, in other words (across RL as shown in the circuit), the red light 60 (RR) on the indicator as aforementioned will be illuminated to indicate that braking is occurring. A diode D1 is provided in the circuit in series with RL to isolate the amplifier circuitry and prevent feedback flow of current from the manual actuation of the brakes (by brake switch 37) from entering the amplifier circuit and especially transistor T. Resistors RB and RE, RB being connected to the base and RE to the emitter of the transistor, bias the transistor into the desired operating range. A capacitor C is provided in parallel with the bias resistor RB and is connected to the base of the transistor to eliminate fluctuations in the voltage applied to the base of the transistor and thereby provide for smoother braking. A relay RA is positioned in parallel with RR and RL - D1. This relay which is normally not energized is connected as shown in FIG. 13 to a normally closed contact 71 which is positioned in series with a green light RG (62). The green light will then normally be on when switch 25 (the off/on switch to the system) is in the on position. This is the normal operating condition for the circuit when the lateral acceleration is not sufficient to cause either pendulum to swing away from its home position. Relay RA is also connected to a normally opened contact 72 which is in series with Ry (60) the yellow light. The yellow light is in parallel with the green light. However, because of this normally opened contact the yellow light will be off during normal operation. However, when either pendulum begins to swing away from its support transistor T will begin to operate to cause a small current flow through RL and RR and also through the relay RA, this current flow will cause RA to open, normally closed contact 71, and turn off the green light. It will also close normally opened contact 72 and light the yellow light. As the pendulum swings further away this yellow light will stay lit and so will the red light because of the additional current flow will become visible and then increase in brightness. In this manner the operator of the car will see the yellow light first and realize that lateral acceleration has increased to the point where the brakes in the trailer may be actuated automatically. The operator can then use manual switch 37 to brake the trailer. However, if he does not the brakes will automatically be applied by the sensor of this invention. FIG. 13 also shows the connection of the brake lights RBL of the car, these brake lights are connected in parallel with the yellow light so as soon as the yellow light is lit the car brake lights and the trailer brake lights, because of the interconnection between the two, will be lit. A diode D2 is also provided in series with RBL for similar reasons to D1 — that is to prevent currents from the manual actuation of the brakes from affecting this circuit. It will be appreciated from this circuit that if the range of the potentiometers PR and PL is great when compared to resistors RB AND RE, a slight rotation of the potentiometer will cause a large change in the current to the brakes (RL). This sensitivity is desirable and is a major purpose of the amplifier circuit so that small pendulum swing angles will be magnified to provide greater sensitivity. A power switch S25 is also provided in the circuit to turn on the unit as will be described in more detail hereafter. Typical values of some components of the circuit are the diodes being 10 amps, RR being about 12 to 14 volts and 120 ma and the transistor T being 15 amps. RB would be 15 ohms, 5 watts, RE would be 0 ohms, the capacitor would be 200 microfarads and the transistor aforementioned would be an PNP silicone power transistor of 70 watts, 15 amps, and PR and PL would have a 0 to 100 ohm linear range. It will be appreciated that the above values are merely indicative of one example.

Figure 15:
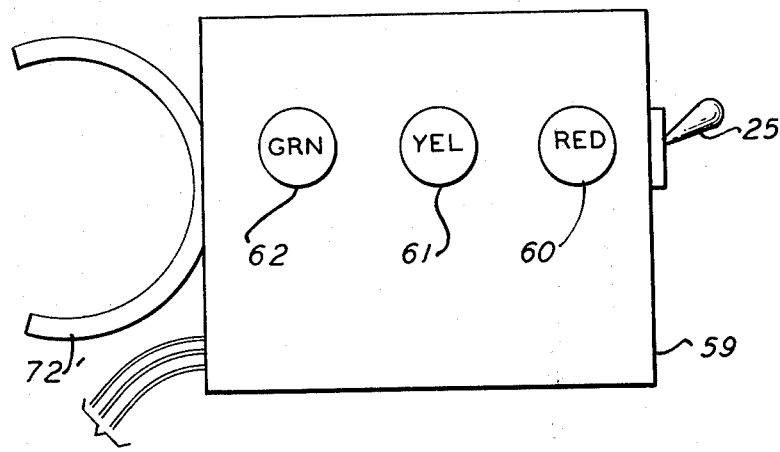
FIG. 15 is a view of the indicating light panel associated with this invention.
Figure 16:
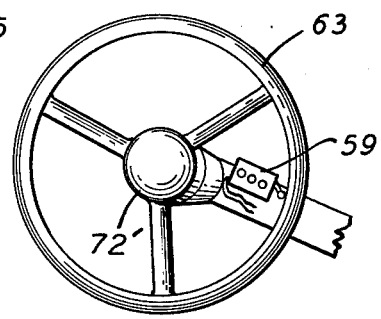
FIG. 16 is a view of the mounting of the indicating light panel on the steering wheel of an automobile.
Figure 17:
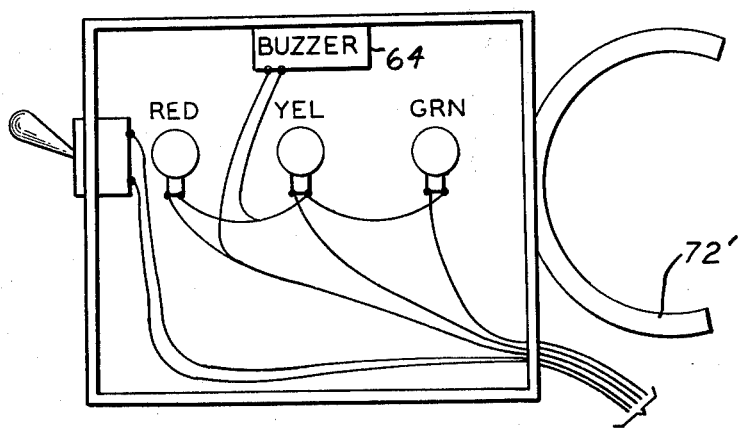
FIG. 17 is a rear cutaway view of the indicating lights of FIG. 15

The indicator unit 59 as shown in FIG. 16 can be mounted on the dashboard or mounted on the steering column (if it is mounted on the steering column, clip 72' is provided to clip it to the steering column) and essentially consists, as shown in FIGS. 17 and 15, of a rectangular unit having three indicating lights 60, 61 and 62 — red, yellow and green. These can be either separately colored lights or they can all be white lights and pieces of colored plastic can be placed on the outer face of the indicating unit so that the lights appear to glow in the three respective colors. Each of the lamps is wired to the potentiometers 9 and a buzzer 64 is placed across light 60 the red light as aforementioned. There is also preferably an on/off switch 25 which is connected to the amplifier circuit so that the entire unit can be turned off if so desired. The buzzer 64 is connected to the red light to indicate when the red light is on or in other words, when the brakes are being applied. As aforementioned, in normal operation the green light will be on. However, when either pendulum has swung past the angle $\theta$ and into the angle $\phi$, the yellow light will be actuated. Once it has swung to a sufficient angle then the red light will be actuated and the buzzer will sound and the brakes will begin to be applied. As the pendulum swings further and further away from the angle $\theta$ and the angle $\phi$ increases the brakes will be applied more and more until the trailer is brought back to a safe speed.

In operation then, the pendulum sensing unit is mounted in the trunk of the car and interconnected into the circuitry that actuates the brakes of the trailer. The indicating unit is connected in circuit with the pendulum unit and is physically placed in a convenient spot for actuation by the driver. This indicating unit has an off-on switch which can turn the entire pendulum unit off if so desired. When the switch is in the "on" position and the pendulum unit is thereby actuated for operation and the car and trailer proceed around a turn at a greater speed than has been preset, one of the pendulums will begin to swing away from its support and thereby cause a rotation of its potentiometer to change the resistance in the circuit. Ths resistance is amplified through an appropriate amplifier circuit to thereby actuate the brakes of the trailer to begin to apply some braking force. This braking force is applied until the speed of the vehicle is decreased to a safe point — the point where the trailer is under control. This point is preset by means of the angular adjustment of the pendulums.

The system has been described with respect to an automobile and a trailer. However, it will be appreciated that it can be used with a cab and a truck or any two vehicles or for that matter can be used in a single unit to actuate the brakes automatically on that vehicle. Also, it will be appreciated that it can be used basically to detect any tilting of a vehicle or any other device since the basic tilting of the device causes the actuation of the pendulum. It will thus be seen that the device can be used to act as a burglar alarm to detect any unauthorized tilting of a vehicle. It will also be appreciated that lateral acceleration from any source on the car can actuate the present system, such acceleration can be produced as aforementioned, by travelling around a curve, it can also be produced by wind and especially by wind gusts and can also be produced by many other causes.

Figure 14:
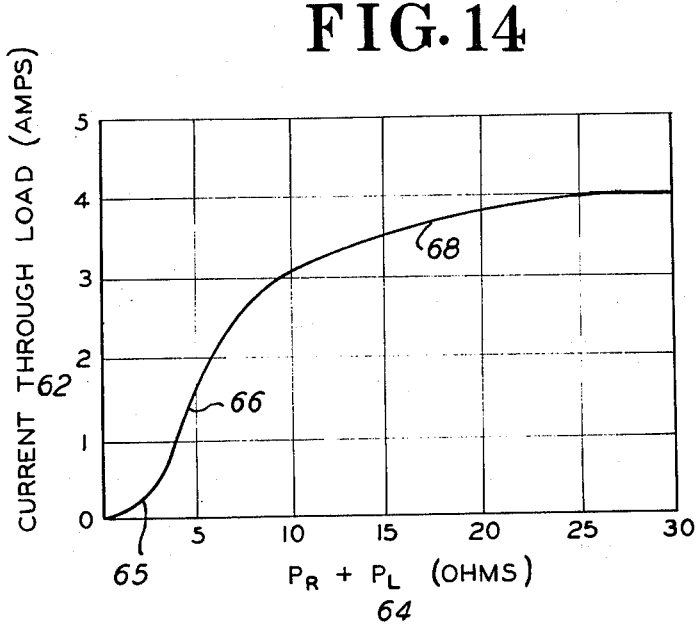
FIG. 14 is a graph of current through the electric brakes versus ohms of the potentiometer for the system of the sensor of this invention.

FIG. 14 shows a plot of current to the brakes in amps 62 versus the resistance through the potentiometer 64, as controlled by the pendulums. As a pendulum swings outward the resistance of its potentiometer increases and the current to the brakes increases. It increases slowly 65 and then very rapidly 66 and then levels off 68. This provides for quick response and sufficiently long response until the lateral acceleration has been reduced below the desired amount.

Figure 14A:
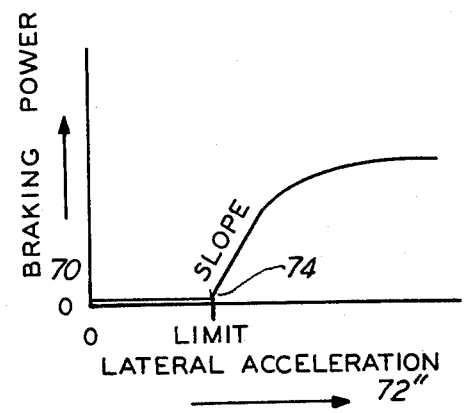
FIG. 14A shows the braking power vs. lateral acceleration for the system of FIG. 14.

FIG. 14A shows a plot of increasing braking power 70 versus lateral acceleration 72''. The braking power remains at 0 until the lateral acceleration has reached the critical point (74) where a pendulum begins to swing away from the support. At that point the braking power increases until the lateral acceleration is brought under control. Thus, it will be appreciated that a highly efficient lateral acceleration sensing system has been disclosed.

While specific embodiments of the invention have been described, it will be appreciated that the invention is not limited thereto since many modifications may be made by one skilled in the art which fall within the spirit and scope of the invention.

What is claimed is:

1. An automatic stability control system for a vehicle to prevent swerving and swaying of said vehicle, said system comprising means for sensing lateral acceleration forces acting upon said vehicle to provide low level electrical acceleration signals representative of the magnitude of said forces, means for amplifying said low level acceleration signals to provide large amplitude brake control signals proportional to the magnitude of the forces, and brake means associated with said vehicle including right and left brakes and responsive to said brake control signals to simultaneously actuate said right and left brakes in equal, gradual and continuous mode to prevent swaying and swerving of said vehicle, said sensing means including a pair of pendulums oriented to sense only left and right acceleration, respectively, each of said pendulums including adjustable stop means positioning the pendulum in a predetermined angular at rest position for varying the minimum lateral acceleration force necessary to effect movement of each pendulum, each of said pendulums being operatively associated with a potentiometer to provide low level electrical lateral acceleration signals proportional to the magnitude of movement of the pendulums such that instantaneous response is provided upon movement of a pendulum.

2. The system as defined in claim 1 wherein said brake means is on a towed trailer having a towing vehicle articulately connected thereto.

3. The system as defined in claim 2 in which each pendulum and associated potentiometer are mounted within a housing, said adjustable stop means being accessible externally of the housing for adjustment thereof.

4. An automatic stability control system for a vehicle to prevent swerving and swaying of said vehicle, said system comprising means for sensing lateral acceleration forces acting upon said vehicle to provide electrical acceleration signals representative of the magnitude of said forces, means for amplifying said acceleration signals to provide brake control signals proportional to the magnitude of the forces, and brake means associated with said vehicle including right and left brakes and responsive to said brake control signals to simultaneously actuate said right and left brakes in equal, gradual and continuous mode to prevent swaying and swerving of said vehicle, said sensing means including a pair of pendulums oriented to sense only left and right acceleration, respectively, each of said pendulums including adjustable stop means positioning the pendulum in a predetermined angular at rest position for varying the minimum lateral acceleration force necessary to effect movement of each pendulum, each of said pendulums being operatively associated with a potentiometer to provide electrical lateral acceleration signals proportional to the magnitude of movement of the pendulums, said brake means being on a towed trailer having a towing vehicle articulately connected thereto, each pendulum and associated potentiometer being mounted within a housing, said adjustable stop means being accessible externally of the housing for adjustment thereof, each pendulum including a pivotal support arm having a weight on one end thereof, said housing including a slot therein, said stop means including locking means extending through said slot to enable adjustment and locking of the stop means from the exterior of the housing.

5. The system as defined in claim 4 wherein said support arm is directly supported from a rotatable shaft component of the potentiometer.

* * * * *